(12) United States Patent
Ogata et al.

(10) Patent No.: US 7,419,718 B2
(45) Date of Patent: Sep. 2, 2008

(54) SOLUTION FOR FORMING ULTRA HYDROPHILIC PHOTOCATALYST FILM, CONSTRUCT PROVIDED WITH THE FILM AND PROCESS FOR PRODUCING THE SAME

(75) Inventors: Shiro Ogata, Tokyo (JP); Yoshimitsu Matsui, Saga (JP)

(73) Assignee: Sustainable Titania Technology Incorporated, Tokyo (JP)

( * ) Notice: Subject to any disclaimer, the term of this patent is extended or adjusted under 35 U.S.C. 154(b) by 373 days.

(21) Appl. No.: 10/481,739

(22) PCT Filed: Feb. 25, 2003

(86) PCT No.: PCT/JP03/02041

§ 371 (c)(1),
(2), (4) Date: May 3, 2004

(87) PCT Pub. No.: WO03/072661

PCT Pub. Date: Sep. 4, 2003

(65) Prior Publication Data

US 2005/0069639 A1      Mar. 31, 2005

(30) Foreign Application Priority Data

Feb. 27, 2002  (JP) ............................ 2002-051056

(51) Int. Cl.
B32B 5/16 (2006.01)
C09K 3/18 (2006.01)
B05D 3/02 (2006.01)

(52) U.S. Cl. .......................... 428/323; 428/328; 106/5; 106/13; 252/70; 252/194; 427/372.2

(58) Field of Classification Search ....................... None
See application file for complete search history.

(56) References Cited

U.S. PATENT DOCUMENTS

| 3,896,753 | A | * | 7/1975 | Shepherd et al. | .......... 114/67 R |
| 5,616,532 | A | * | 4/1997 | Heller et al. | ................. 502/242 |
| 6,107,241 | A | * | 8/2000 | Ogata et al. | ................. 502/350 |
| 6,500,415 | B2 | * | 12/2002 | Ishii et al. | ................. 424/78.03 |

* cited by examiner

*Primary Examiner*—Sheeba Ahmed
(74) *Attorney, Agent, or Firm*—Fay Sharpe LLP

(57) ABSTRACT

A coating film forming liquid containing a saccharide, and titanium oxide fine particles having peroxy groups or titanium oxide fine particles not having peroxy groups is applied onto a surface of a substrate such glass, metal or a tile, and then heating is carried out at a high temperature, thus forming on the substrate a super-hydrophilic photocatalytic coating film that contains titanium oxide fine particles and has a water contact angle in a state in which the photocatalyst is not excited of less than 10°.

14 Claims, No Drawings

SOLUTION FOR FORMING ULTRA HYDROPHILIC PHOTOCATALYST FILM, CONSTRUCT PROVIDED WITH THE FILM AND PROCESS FOR PRODUCING THE SAME

TECHNICAL FIELD

The present invention relates to an aqueous liquid capable of forming a super-hydrophilic photocatalytic coating film that has photocatalytic ability and also exhibits a low water contact angle in a state in which the photocatalyst is not excited, and a structure having the coating film and a method of manufacturing the structure. More specifically, the present invention relates to an aqueous liquid capable of forming, on a surface of any of various substrates such as glass, a coating film that has photocatalytic ability, and is also super-hydrophilic, having a water contact angle of less than 10° in a state in which the photocatalyst is not excited, and thus exhibiting anti-fouling ability and anti-fogging ability in this non-excited state, and moreover preferably has excellent water-retaining ability, wear resistance (i.e. high hardness) and transparency. Moreover, the present invention also relates to a structure comprising glass, metal or a ceramic such as a tile having the coating film on a surface thereof, and a method of manufacturing the structure.

BACKGROUND ART

Applying a titanium-containing substance onto a surface of any of various materials, for example any of various building materials such as glass, a ceramic or a tile, to form a photocatalytic coating film comprising titanium oxide (titania), and thus realizing any of various functions such as an anti-fouling function, an antimicrobial function, a gas decomposing function or a harmful organic matter decomposing function realized through the photocatalytic ability of the coating film, is something that has been carried out from hitherto. Regarding the method of forming such a titanium oxide coating film, for example a method is known in which a dispersion containing fine particles of a titanium oxide or a solution of a titanium compound is applied onto the substrate surface, and then after the application, drying or if necessary low-temperature baking is carried out.

In particular, it is known that as the titanium oxide used for realizing the photocatalytic ability, not only titanium dioxide such as anatase-type or rutile-type titanium oxide, but also a titanium oxide having peroxy groups, i.e. titanium peroxide, can be used. With regard to this titanium peroxide, it is also known that only the anatase type has catalytic ability (Japanese Patent Application Laid-open No. 9-124865).

Due to such anatase-type titanium peroxide having photocatalytic ability as mentioned above, the above-mentioned patent document also describes using this anatase-type titanium peroxide as a photocatalytic film by forming a coating film thereof on a substrate surface of any of various structures.

Moreover, regarding the amorphous type, there is no photocatalytic ability, but the bonding ability is excellent, and hence use as a photocatalyst particle binder when forming a photocatalytic coating film has been proposed (Japanese Patent Application Laid-open No. 9-262481).

However, a coating film formed from anatase-type titanium peroxide has photocatalytic ability as described above, and yet the electrical conductivity is insufficient, and hence such a coating film has not been adequate for use as an electromagnetic wave shield, an antistatic material or the like. A coating film formation technique for improving the electrical conductivity has thus already been proposed (Japanese Patent Application Laid-open No. 11-315592), but this coating film formation technique has not been adequate since the formation process is complex.

To resolve such problems, the present inventors have developed a titanium peroxide-containing aqueous liquid that enables a coating film having photocatalytic ability, and electrical conductivity useful for electromagnetic wave shielding, prevention of static and so on to be formed more easily, and have already filed patent applications (Japanese Patent Application No. 2001-4506, Japanese Patent Application No. 2001-250468). However, although this titanium peroxide-containing aqueous liquid has high functionality and is easy to use, the hardness has not been sufficient for forming a serviceable coating film having photocatalytic ability on glass, resin sheets, metal plates and so on. The present inventors thus focussed on this point, and also developed art for a coating film forming liquid capable of forming a high-hardness photocatalytic coating film, and have already filed a patent application (Japanese Patent Application No. 2002-11493).

[Problems to be Solved]

However, in the case of forming a coating film on the surface of glass, metal or the like using a conventional titanium peroxide-containing aqueous liquid as described above or a titanium oxide-containing liquid in which titanium oxide is dispersed in a liquid containing a substance having an alkyl silicate structure, it has been observed that under environments in which the photocatalytic ability is not readily exhibited, for example in bathrooms or washrooms or inside automobiles, fogging may arise on mirrors or on glass surfaces inside automobiles, and hence the hydrophilicity and anti-fogging ability have not been adequate for mirrors, glass and so on.

[Object of the Invention]

It is an object of the present invention to provide art enabling formation, on the surface of any of various substrates, of a coating film that has photocatalytic ability and moreover is super-hydrophilic in a state in which the photocatalyst is not excited. Specifically, it is an object of the present invention to provide an aqueous liquid capable of forming, on the surface of a substrate such as glass, a ceramic or metal, a coating film that is super-hydrophilic in a state in which the photocatalyst is not excited, a structure having this coating film, and a method of manufacturing the structure having the coating film. Moreover, it is an object of the present invention to provide art enabling formation of a coating film that preferably not only has super-hydrophilicity but also has water-retaining ability, wear resistance (high hardness) and transparency.

DISCLOSURE OF THE INVENTION

To solve the problems described above, the present invention provides a super-hydrophilic photocatalytic coating film forming liquid, a structure having the coating film on a surface thereof, and a method of manufacturing the structure, wherein the super-hydrophilic photocatalytic coating film forming liquid is characterized by containing a saccharide and fine particles of a titanium oxide having peroxy groups, or a saccharide and fine particles of a titanium oxide not having peroxy groups, and by forming a coating film having a water contact angle of less than 10° in a state in which the photocatalyst is not excited.

Moreover, the structure having the super-hydrophilic photocatalytic coating film on a surface thereof is characterized in that the water contact angle is less than 10° in a state in which the photocatalyst is not excited. Furthermore, the method of manufacturing the structure is characterized by applying an aqueous liquid containing a saccharide and fine particles of a titanium oxide having peroxy groups, or a saccharide and fine particles of a titanium oxide not having peroxy groups, onto a substrate surface, and heating at a high temperature, thus forming a coating film containing titanium oxide fine particles on the substrate.

In the present invention, any of various saccharides such as a monosaccharide such as glucose or a disaccharide such as sucrose is present in the super-hydrophilic coating film forming liquid; film formation is carried out using a coating film forming liquid in which the saccharide is present in addition to fine particles of a titanium oxide having peroxy groups or fine particles of a titanium oxide not having peroxy groups, and heating is carried out after the film formation, whereby a photocatalytic coating film that is super-hydrophilic in a state in which the photocatalyst is not excited and also has water-retaining ability can be formed on any of various structures.

More specifically, a photocatalytic coating film that exhibits super-hydrophilicity, with the water contact angle being less than 10° in a state in which the photocatalyst is not excited, can be formed on glass, metal or a ceramic such as a tile. As a result, even in an environment in which a high-humidity state is produced such as in a bathroom or washroom or inside an automobile, a super-hydrophilic anti-fogging photocatalytic coating film that enables the occurrence of fogging to be suppressed can be formed, for example, on a mirror or a tile, or the surface of glass inside an automobile. Moreover, by using a coating film in which fine particles of a titanium oxide having peroxy groups or fine particles of a titanium oxide not having peroxy groups have been doped with a special compound, the coating film can be given not only super-hydrophilicity but also good wear resistance.

BEST MODE FOR CARRYING OUT THE INVENTION

As described above, the present invention provides a coating film forming liquid, a structure having the coating film attached to a surface thereof, and a method of manufacturing the structure; a detailed description of these will be given below, but it should be noted that the present invention is specified through the description in the claims, and hence is of course not limited by the following description of modes for carrying out the invention.

[A] Regarding the Super-Hydrophilic Photocatalytic Coating Film Forming Liquid (1) Composition of Super-Hydrophilic Photocatalytic Coating Film Forming Liquid The super-hydrophilic photocatalytic coating film forming liquid of the present invention contains a saccharide and titanium oxide fine particles, and enables formation of a coating film having a water contact angle of less than 10° in a state in which the photocatalyst is not excited. This contact angle is preferably less than 10°, more preferably not more than 8°, yet more preferably not more than 5°.

Moreover, either fine particles of a titanium oxide having peroxy groups or fine particles of a titanium oxide not having peroxy groups can be used as the above-mentioned titanium oxide fine particles.

(1-1) Saccharide

There are no particular limitations on the saccharide used in the super-hydrophilic photocatalytic coating film forming liquid of the present invention, so long as this saccharide is water-soluble; any of a monosaccharide, a disaccharide or a polysaccharide can be used, but a minor saccharide such as a monosaccharide or a disaccharide is particularly preferable.

Examples of monosaccharides are glucose, fructose, sorbitol and ketohexose, and examples of disaccharides are sucrose, maltose and lactose.

(1-2) Concentration of Saccharide

The concentration of the saccharide in the coating film forming liquid is suitably 0.01 to 20 wt %, preferably 0.1 to 10 wt %. Note that the relationship between the content of the saccharide and the above-mentioned contact angle is not fixed, varying according to the concentration of the dispersion containing the fine particles of the titanium oxide having peroxy groups, and whether or not there is a doping compound and if so the type thereof, but the super-hydrophilicity improves as the content of the saccharide is increased, i.e. the above-mentioned contact angle drops.

(1-3) Concentration of Titanium Peroxide or Titanium Oxide

The concentration of the titanium peroxide or titanium oxide in the coating film forming liquid (in the case of doped titanium peroxide or titanium oxide, described later, the total amount including the coexisting compound) is suitably 0.05 to 15 wt %, preferably 0.1 to 5 wt %.

(1-4) Dispersion Containing Titanium Peroxide or Titanium Oxide

A dispersion containing a titanium oxide having peroxy groups used in the preparation of the super-hydrophilic coating film forming liquid of the present invention may be one containing amorphous-type titanium peroxide fine particles or anatase-type titanium peroxide fine particles alone, or may be one containing both of these. To prepare a dispersion containing both of these, a dispersion containing amorphous-type titanium peroxide fine particles and a dispersion containing anatase-type titanium peroxide fine particles are mixed as appropriate such that the ratio therebetween becomes as desired.

Moreover, as a solution containing titanium oxide fine particles dispersed in a liquid containing a substance having an alkyl silicate structure, for example commercially sold Hydrotect Glass Coat (made by Japan Hydrotect Coating K.K.) can be used.

Moreover, as the dispersion containing titanium peroxide or titanium oxide, one doped with another compound may be used; in particular, in the case of using one doped with a calcium compound, a coating film having high hardness can be formed as already proposed by the present inventors (Japanese Patent Application 2002-11493). For example, this is preferable in the case of forming the coating film on a mirror, an automobile windshield or the like, since in addition to having anti-fogging ability due to the super-hydrophilicity, the coating film will not be easily scratched and hence will be excellent in terms of serviceability. Moreover, it is also suitable to dope with silica, since in this case a coating film having a similarly high hardness can again be formed.

Furthermore, regarding the titanium peroxide or titanium oxide dispersion, one doped with an electrical conductivity-improving substance can also be used; examples of such substances are metal salts of aluminum, tin, chromium, nickel, antimony, iron, silver, cesium, indium, cerium, selenium, copper, manganese, platinum, tungsten, zirconium, zinc and so on, and also hydroxides, oxides and so on of some metals and nonmetals.

More specifically, to give names of substances, examples are various metal salts such as aluminum chloride, stannous and stannic chloride, chromium chloride, nickel chloride, antimonious and antimonic chloride, ferrous and ferric chloride, silver nitrate, cesium chloride, indium trichloride, cerous chloride, selenium tetrachloride, cupric chloride, manganese chloride, platinic chloride, tungsten tetrachloride, tungsten oxydichloride, potassium tungstate, auric chloride, zirconium oxychloride, and zinc chloride. Moreover, in addition to metal salts, other examples are compounds such as indium hydroxide and silicotungstic acid.

(1-4-1) Methods of Manufacturing Titanium Peroxide Dispersion—First Method

Next, a description will be given of methods of manufacturing a dispersion containing a titanium oxide having peroxy groups.

First, describing a method of manufacturing a dispersion containing an amorphous-type titanium oxide having peroxy groups, titanium hydroxide is produced by mixing together a tetravalent titanium salt and a basic solution and carrying out reaction.

There are no particular limitations on the concentration and temperature of the reaction liquid in this case, but it is preferable to carry out the reaction using a dilute solution at room temperature. The reaction is a neutralization reaction, and it is preferable to adjust to from acidic to neutral, i.e. to a pH of 7 or less. Note that in the case that one wishes to manufacture a dispersion doped with any of various components such as a calcium compound, it is preferable to mix in the doping compound before mixing with the basic solution.

If the hydroxide obtained as described above is washed with pure water, and then peroxidation is carried out using a hydrogen peroxide aqueous solution, then an aqueous liquid containing fine particles of an amorphous-type titanium oxide having peroxy groups, i.e. an amorphous-type titanium peroxide-containing dispersion, can be manufactured. Moreover, in the case of manufacturing an anatase-type titanium peroxide-containing dispersion, the amorphous-type dispersion may be converted into the anatase type by heating. The heating is preferably carried out at 80 to 200° C. in this case.

Hydrogen peroxide is preferable as the oxidizing agent when carrying out the peroxidation described above, and there is no particular limitation on the concentration thereof, although 30 to 40% is suitable. Note that the oxidizing agent is not limited to being hydrogen peroxide, with it being possible to use any of various oxidizing agents so long as a peroxidated substance, i.e. titanium peroxide, can be formed as described above.

(1-4-2) Methods of Manufacturing Titanium Peroxide Dispersion—Second Method

Next, a detailed description will be given of a method of manufacturing a dispersion containing titanium peroxide doped with a calcium compound, which is used when manufacturing a coating film forming liquid capable of forming a coating film having not only super-hydrophilicity when the photocatalyst is not excited but also wear resistance.

A hydroxide of titanium is produced by reacting together a mixed liquid containing a tetravalent titanium salt and a calcium compound, preferably a calcium salt, and a basic solution. As a result, a calcium compound coexists with titanium hydroxide in the hydroxide produced.

Next, the hydroxide obtained is washed with pure water, and then peroxidation is carried out using a hydrogen peroxide aqueous solution, whereby an aqueous liquid containing fine particles of a titanium oxide having peroxy groups doped with a calcium compound is prepared. There are no particular limitations on the concentration and temperature of the reaction liquid in this case, but it is preferable to carry out the reaction using a dilute solution at room temperature. The reaction is a neutralization reaction, and it is preferable to adjust to from acidic to neutral, i.e. to a pH of 7 or less.

Next, it is preferable to carry out solid-liquid separation through gravitational sedimentation, centrifugal separation or the like of the titanium hydroxide gel containing the calcium compound, and then after the separation it is preferable to wash the formed titanium hydroxide gel with water. The chemical structure and so on of the calcium compound in the titanium hydroxide gel has not been identified, but this calcium compound is a calcium compound after addition of a basic solution, and hence is thought to be a hydroxide or the raw material calcium compound used or the like. Moreover, it is thought that the calcium compound may be partially dissolved and thus ionized.

By adding an oxidizing agent such as hydrogen peroxide to the calcium compound-doped titanium hydroxide obtained as described above and thus carrying out peroxidation, amorphous-type titanium peroxide is formed, with the size of the particles thereof being 2 to 10 nm. The coating film forming liquid containing amorphous-type titanium peroxide obtained in this way is capable of forming a film having excellent adhesive strength, but has no catalytic ability. By heating the amorphous-type titanium peroxide film formed, preferably at an ambient temperature of at least 250° C., conversion from the amorphous type to the anatase type takes place, whereby catalytic ability can be realized.

(1-4-3) Methods of Manufacturing Titanium Peroxide Dispersion—Third Method

Furthermore, there is another method of manufacturing the coating film forming liquid described above. That is, it is possible to react a solution containing a tetravalent titanium salt and a basic solution together to produce a hydroxide, wash with pure water, and then mix in a calcium compound-containing liquid. The titanium hydroxide in the mixed liquid obtained in this way is peroxidated using an oxidizing agent such as a hydrogen peroxide aqueous solution, thus forming an aqueous liquid containing fine particles of a titanium oxide having peroxy groups having a calcium compound coexisting therewith. It is preferable to carry out cooling before the oxidation. It is preferable to carry out this cooling such that the temperature of the titanium hydroxide becomes 1 to 5° C.

A coating film forming liquid containing an anatase-type titanium oxide having peroxy groups having calcium coexisting therewith is then manufactured by heating the aqueous liquid containing fine particles of an amorphous-type titanium oxide having peroxy groups obtained as described above, thus converting to the anatase type. The heating temperature in this case is preferably 80 to 200° C., and in particular heating at 100° C. in an autoclave is simple and thus preferable, and the coating film forming liquid obtained in this way has high transparency. As a result, a coating film formed has high transparency, and is thus suitable for applications in which good visibility performance or decorative performance is required.

(1-5) Tetravalent Titanium Salt

As the tetravalent titanium salt used in the manufacture of the coating film forming liquid of the present invention, any of various titanium compounds can be used so long as a gel of titanium hydroxide, also known as orthotitanic acid ($H_4TiO_4$) can be formed upon reacting with a basic solution such as ammonia water or a sodium hydroxide solution; examples are water-soluble inorganic acid salts of titanium such as titanium tetrachloride, titanium sulfate, titanium nitrate and titanium phosphate. Other examples are water-soluble organic acid salts such as titanium oxalate.

Out of these various titanium compounds, titanium tetrachloride is preferable, since the solubility in water is particularly good, and components other than the titanium in the titanium compound do not remain behind in the manufactured coating film forming liquid.

(1-6) Basic Solution, Oxidizing Agent

Moreover, regarding the basic solution reacted with the tetravalent titanium salt solution described above, any of various ones can be used so long as a titanium hydroxide gel can be formed upon reacting with the tetravalent titanium salt solution; examples are ammonia water, a sodium hydroxide aqueous solution, a sodium carbonate aqueous solution, a potassium hydroxide aqueous solution and so on, with ammonia water being preferable.

Moreover, as the oxidizing agent used to subsequently oxidize the titanium hydroxide formed, any of various oxidizing agents can be used without limitation so long as a peroxidated substance can be formed through the oxidation; however, hydrogen peroxide is preferable, since residual matter such as metal ions or acid ions will not arise in the coating film forming liquid manufactured.

Regarding the concentrations of the tetravalent titanium salt solution and the basic solution, there are no particular limitations so long as the concentrations during the reaction are within a range such that the titanium hydroxide gel can be formed, although relatively dilute solutions are preferable. Specifically, the concentration of the tetravalent titanium salt solution is suitably to 0.01 wt %, preferably 0.9 to 0.3 wt %. Moreover, the concentration of the basic solution is suitably 10 to 0.01 wt %, preferably 1.0 to 0.1 wt %. In particular, regarding the concentration in the case of using ammonia as the basic solution, the above-mentioned range of 10 to 0.01 wt % is suitable, with 1.0 to 0.1 wt % being preferable.

(1-7) Calcium Compound

As the calcium compound used in the manufacture of the coating film forming liquid of the present invention, any of various calcium compounds can be used so long as the calcium compound is capable of coexisting with the titanium hydroxide formed upon reacting the basic solution (such as ammonia water or a sodium hydroxide aqueous solution) and the tetravalent titanium salt solution together, and the calcium compound does not have extremely low solubility, i.e. is not insoluble in water. Examples are various inorganic calcium compounds such as calcium chloride, calcium nitrate, calcium carbonate, calcium bicarbonate, and calcium hydroxide. Other examples are water-soluble organic acid salts such as calcium formate.

Moreover, as the calcium compound, a compound containing calcium such as a calcium bridged organic pigment can also be used; in this case, it is possible to activate the photocatalyst, dissociate the organic bonds between the calcium and the organic compound that cause the coloration, and thus produce a photocatalytic high-hardness coating film having excellent transparency. Out of the above-mentioned various calcium compounds, water-soluble ones are preferable, with calcium chloride, which has excellent solubility in water, being particularly preferable.

Moreover, regarding the amount at which the calcium compound is made to coexist with the tetravalent titanium salt, the molar ratio between the titanium in the titanium salt and the calcium in the calcium compound is suitably titanium:calcium=1:0.5 to 1:0.001, preferably 1:0.2 to 1:0.01.

The above relates to a method of manufacturing a dispersion containing titanium peroxide doped with a calcium compound, used in the case of manufacturing a coating film forming liquid capable of forming a coating film having super-hydrophilicity when the photocatalyst is not excited and also high hardness; however, similar properties can also be realized in the case of manufacturing a coating film forming liquid using a dispersion containing titanium peroxide doped with silica or zirconium, and in this case the manufacture of the dispersion containing titanium peroxide doped with silica or zirconium can be carried out in a similar way to the case of the manufacture of a dispersion containing titanium peroxide doped with a calcium compound described above.

Moreover, in the case of manufacturing a dispersion containing titanium peroxide not doped with a calcium compound or the like, the manufacture can be carried out similarly but omitting the doping process. Furthermore, the manufacture of a dispersion containing titanium peroxide doped with a compound other than a calcium compound or silica or zirconium can also be carried out in a similar way to the case of the manufacture of a dispersion containing titanium peroxide doped with a calcium compound described above.

(2) Method of Manufacturing Super-hydrophilic Photocatalytic Coating Film Forming Liquid As described above, the super-hydrophilic photocatalytic coating film forming liquid contains a saccharide, and fine particles of a titanium oxide having peroxy groups (titanium peroxide) or fine particles of a titanium oxide not having peroxy groups, and hence the manufacture of the coating film forming liquid is typically carried out by mixing together a dispersion containing titanium peroxide or titanium oxide, and a saccharide aqueous solution.

Moreover, other methods are not excluded whatsoever so long as both of the above components can be included; for example, the manufacture can also be carried out by adding a saccharide to a dispersion containing titanium peroxide and dissolving the saccharide. Furthermore, the dispersion containing titanium peroxide and the saccharide aqueous solution may also be stored in separate vessels, and mixed together at the site of film formation. Moreover, it is also possible to add a saccharide to a dispersion containing a titanium oxide and a substance having an alkyl silicate structure.

[B] Regarding the Structure Having a Super-Hydrophilic Photocatalytic Coating Film (1) Method of Forming Super-Hydrophilic Coating Film on Surface of Structure To form a super-hydrophilic coating film on the surface of a structure using a super-hydrophilic photocatalytic coating film forming liquid as described in [A] above, it is necessary to carry out heating at a high temperature after forming the film; through this high-temperature heating, the film formed on the surface of the structure can be converted into being super-hydrophilic.

The heating temperature is suitably 300 to 900° C., preferably 400 to 800° C. The reason for this is that if the heating temperature is less than 300° C. then the super-hydrophilicity will not be sufficient, whereas if the heating temperature exceeds 900° C. then the materials that can be used will be limited and moreover energy costs will mount up. In particular, in the case of general-purpose soda glass, the softening point is low, and hence it is preferable to carry out the heating at around 700° C.

Regarding this heating step, rather than separately providing a step for the heating, it is preferable in terms of both thermal energy and equipment to utilize a heating step or heat treatment step that was originally present in the production line. For example, in the process of manufacturing any of plate glass, a metal plate, tempered glass or a tile, there is a heating step in the production line, and it is efficient and thus preferable to carryout the heating after the film formation in this step.

Note that as described above, as the fine particles of a titanium oxide having peroxy groups or the fine particles of a titanium oxide not having peroxy groups used in the super-hydrophilic photocatalytic coating film forming liquid, either amorphous type or anatase type can be used, or a mixture of the two can be used. In the case of using any of the amorphous type, the anatase type or a mixture of the two, after carrying out film formation using an aqueous liquid thereof, it is necessary to carry out heating, and the heating temperature at this time is preferably 400 to 800° C.

Through this heating, the formed film is converted into being super-hydrophilic, and moreover it has been observed that if the heat treatment temperature is low then discoloration to a caramel color occurs; it is thus thought that the nature of the saccharide present during the film formation and the existence of the heat treatment step are deeply involved in the formation of a super-hydrophilic photocatalytic coating film, and that through the heating the saccharide is decomposed, discharging carbondioxide, and as a result the coating film becomes porous, whereby the super-hydrophilicity is realized.

(1-1) Thickness of Coating Film, and Method of Forming Film

The thickness of the coating film is suitably 0.01 to 2.0 µm, preferably 0.1 to 1.0 µm, in terms of the thickness after the heat treatment. There are no particular limitations on the film formation method for forming the coating film so long as a coating film having the above-mentioned thickness after the heat treatment can be formed; examples area spraying method, a spin coating method, a roll coating method, a silk printing method, and so on.

(1-2) Object on which Coating Film is Formed

There are no particular limitations on the object on which the coating film is formed using the coating film forming liquid of the present invention, so long as this object is required to have photocatalytic ability, and also to have super-hydrophilicity, i.e. anti-fogging ability, when the photocatalyst is not excited; examples are plate glass, metal plates, tempered glass, tiles, and so on. More specifically, examples are building material glass, automobile glass, various mirrors (bathroom, washroom, highway, reflectors), swimming goggles, spectacles, traffic lights, glass for protecting sensor equipment, glass tableware, refrigerator/freezer showcase glass, display glass, medical/dental mirrors, medical cameras such as endoscopes, heat exchanger metal fins, and so on; it is particularly effective to form the coating film on a transparent substrate.

(1-3) Conditions for Forming Coating Film having Desirable Properties

As described above, the present invention provides art enabling a coating film that has a photocatalytic ability and is super-hydrophilic in a state in which the photocatalyst is not excited to be formed on the surface of a structure such as glass, metal or a ceramic; it is particularly preferable for this coating film to have water-retaining ability, high hardness and transparency in addition to having the above-mentioned properties, and to form a coating film satisfying these properties it is preferable for the following conditions to be satisfied.

(a) To realize the super-hydrophilicity of the coating film surface and the strength of the coating film as much as possible, by making the size of the titanium oxide fine particles be approximately 2 to 10 nm, the substance for realizing the super-hydrophilicity (the saccharide) can be dispersed uniformly in the coating film forming liquid, and thus can be arranged regularly at the film formation surface.

(b) It is preferable for the liquid after inclusion of the substance for realizing the super-hydrophilicity (the saccharide) to be transparent, for the temperature of the heat treatment of the applied film formed from the liquid to be as low as possible, and to make it such that brown solid residue, which is thought to be residue from low-temperature baking of the saccharide, does not appear after the heat treatment.

(c) It is preferable for the water contact angle of the coating film obtained by carrying out heat treatment on the applied film to be less than 10°, and to be as low as possible, i.e. for the coating film to be super-hydrophilic.

(d) Components other than the photocatalytic component, the film formation method, the heat treatment method and so on should not impair the photocatalytic ability of the coating film formed.

(2) Method of Manufacturing Structure having Super-Hydrophilic Photocatalytic Coating Film Next, a description will be given of a method of manufacturing a structure having a super-hydrophilic photocatalytic coating film.

To manufacture a structure having a super-hydrophilic photocatalytic coating film, the super-hydrophilic photocatalytic coating film forming liquid is applied onto the surface of the structure. Any of various application means can be used for the application, with there being no particular limitations; examples are roll coating, gravure coating, vapor deposition, spin coating, dip coating, bar coating, spray coating, and soon, with spray coating being preferable from the standpoint of reducing interference colors from the titanium.

In particular, with metal plates of stainless steel, aluminum or the like, plate glass, or plate-shaped ceramics such as tiles, there are various modes of use for which photocatalytic ability and also super-hydrophilicity in a state in which the photocatalyst is not excited are desired, and moreover there is a heating step in the manufacturing process, forming process, tempering process, rolling process, machining process or the like for these substrates, and hence it is possible to carry out film formation using the super-hydrophilic photocatalytic coating film forming liquid on the substrate surface during this heating or while there is still residual heat after the heating step, and thus form the super-hydrophilic photocatalytic coating film using this heating or residual heat, whereby manufacture can be carried out efficiently.

For example, describing the case of plate glass or product derived therefrom, for plate glass, there is a glass heating step in each of a plate glass manufacturing process, a tempered glass manufacturing process, a bent tempered glass manufacturing process, and a laminated glass manufacturing process, and hence film formation can be carried out during this heating step or while residual heat still exists after the heating step, whereby a super-hydrophilic photocatalytic coating film can be formed by effectively utilizing this heat.

Specifically, in a plate glass manufacturing process, the glass raw materials are melted in a melting furnace, plate glass is formed using a float bath or the like, and then in a step before introducing the plate glass into an annealing furnace, the super-hydrophilic photocatalytic coating film forming liquid can be applied on to form a film of thickness approximately 0.1 to 0.5 µm, whereby production of the super-hydrophilic photocatalytic coating film can be carried out utilizing the residual heat possessed by the glass.

In a tempered glass manufacturing process, the super-hydrophilic photocatalytic coating film forming liquid can be applied on the plate glass before it is introduced into a heating furnace, as in the case of the plate glass manufacturing process. The super-hydrophilic photocatalytic coating film forming liquid can also be applied on the plate glass before an air-cooled tempering step, whereby the formation of the coating film can be carried out utilizing the residual heat or the like possessed by the glass. In the case of a bent tempered glass or laminated glass manufacturing process, the super-hydrophilic photocatalytic coating film forming liquid can be applied before or after a heating step during the bending and tempering of the plate glass or the manufacture of the laminated glass, whereby the formation of the coating film can be carried out utilizing the residual heat or the like possessed by the glass.

In a metal plate manufacturing process, there is a hot drawing step and cosmetic processing such as surface polishing after this hot drawing step. The super-hydrophilic photocatalytic coating film forming liquid is applied after the cosmetic processing, whereby the super-hydrophilic photocatalytic coating film is formed utilizing the residual heat. In the manufacturing process of a plate-shaped ceramic, there is a sintering step, and the super-hydrophilic photocatalytic coating film forming liquid is applied after this step, whereby the super-hydrophilic photocatalytic coating film is formed utilizing the residual heat.

EXAMPLES

In the following, a description will be given of examples of manufacturing super-hydrophilic photocatalytic coating film forming liquids of the present invention and comparative examples of manufacturing aqueous liquids for comparison. Moreover, glass test pieces having thereon coating films formed using the coating film forming liquids of these examples and comparative examples were manufactured, and evaluation tests were carried out to evaluate various properties for these test pieces; the results thereof will be shown in the following. It goes without saying that the present invention is not limited whatsoever by these examples and evaluation test results.

Example 1

A solution was prepared by adding 10 g of a 50% titanium tetrachloride solution (made by Sumitomo Sitix) to 500 ml of pure water, and adding pure water to make up to 1000 ml. Ammonia water obtained by diluting 25% ammonia water (made by Takasugi Pharmaceutical Co., Ltd.) by a factor of 10 was instilled into the solution to adjust the pH to 6.9, whereby titanium hydroxide was precipitated. The precipitate was continually washed with pure water until the conductivity of the supernatant was no more than 0.8 mS/m; the washing was stopped when the conductivity had become 0.738 mS/m, whereupon 430 g of a liquid containing 0.73 wt % of the hydroxide was produced.

Next, 25 g of 35% hydrogen peroxide (made by Taiki Yakuhin Kogyo K.K.) was added while cooling the liquid to 1 to 5° C., and stirring was carried out for 16 hours, whereby 450 g of a pale yellowish brown dispersion of amorphous-type titanium peroxide of concentration 0.86 wt % was obtained.

Refined sucrose was further added to the dispersion in any of various amounts (wt %) as shown in Table 1 and stirring was carried out, thus preparing super-hydrophilic photocatalytic coating film forming liquids of those concentrations (wt %).

Example 2

A solution was prepared by adding 2.5 g of a 30 wt % silica sol (made by Shokubai Kagaku) and 10 g of a 50% titanium tetrachloride solution (made by Sumitomo Sitix) to 500 ml of pure water, and adding pure water to make up to 1000 ml. Ammonia water obtained by diluting 25% ammonia water (made by Takasugi Pharmaceutical Co., Ltd.) by a factor of 10 was instilled into the solution to adjust the pH to 6.9, whereby a mixture of a silica sol and a titanium oxide was precipitated. The precipitate was continually washed with pure water until the conductivity of the supernatant was no more than 0.8 mS/m; the washing was stopped when the conductivity had become 0.688 mS/m, whereupon 345 g of a liquid containing 0.96 wt % of a hydroxide was produced.

Next, 25 g of 35% hydrogen peroxide (made by Taiki Yakuhin Kogyo K.K.) was added while cooling the liquid to 1 to 5° C., and stirring was carried out for 16 hours, whereby 370 g of a dispersion of amorphous-type titanium peroxide of concentration 1.05 wt % doped with silica was obtained.

Refined sucrose was further added to the dispersion in any of various amounts (wt %) as shown in Table 1 and stirring was carried out, thus preparing super-hydrophilic photocatalytic coating film forming liquids of those concentrations (wt %).

Example 3

A solution was prepared by adding 20 g of a 50% titanium tetrachloride solution (made by Sumitomo Sitix) to a solution that had been obtained by completely dissolving 0.774 g of $CaCl_2.2H_2O$ in 1000 ml of pure water, and adding pure water to make up to 2000 ml. Ammonia water obtained by diluting 25% ammonia water (made by Takasugi Pharmaceutical Co., Ltd.) by a factor of 10 was instilled into the solution to adjust the pH to 7.0, whereby a hydroxide was precipitated. The precipitate was subjected repeatedly to decantation and washing with pure water until the conductivity of the supernatant was no more than 0.8 mS/m; the washing was stopped when the conductivity had become 0.798 mS/m, whereupon 695 g of a liquid containing a hydroxide with a solid content of 0.78 wt % was produced.

Next, the liquid was cooled to 1 to 5° C., a total of 56 g of 35% hydrogen peroxide (made by Taiki Yakuhin Kogyo K.K.) divided into two lots each of 28 g was added, and stirring was carried out for 16 hours, whereby 751 g of a yellowish brown transparent dispersion of amorphous-type titanium peroxide of solid content 0.86 wt % doped with a calcium compound was obtained. Refined sucrose was further added to the dispersion in any of various amounts (wt %) as shown in Table 1 and stirring was carried out, thus preparing super-hydrophilic photocatalytic coating film forming liquids of those concentrations (wt %).

Example 4

A solution was prepared by completely dissolving 1.696 g of $ZrCl_2O.8H_2O$ (zirconium oxychloride) in 20 g of a 50% titanium tetrachloride solution (made by Sumitomo Sitix) and adding pure water to make up to 2000 ml. Ammonia water obtained by diluting 25% ammonia water (made by Takasugi Pharmaceutical Co., Ltd.) by a factor of 10 was instilled into the solution to adjust the pH to 7.0, whereby a mixture of zirconium hydroxide and titanium hydroxide was precipitated. The precipitate was subjected repeatedly to decantation and washing with pure water until the conductivity of the supernatant was no more than 0.8 mS/m; the washing was stopped when the conductivity had become 0.702 mS/m, whereupon 626 g of a hydroxide of concentration 0.79 wt % was produced.

Next, 56 g of a 35% hydrogen peroxide aqueous solution (made by Taiki Yakuhin Kogyo K.K.) was added to the liquid at room temperature, and stirring was carried out for 16 hours, whereby 680 g of a yellowish brown 0.88 wt % amorphous-type titanium peroxide dispersion was obtained.

200 g of the amorphous-type titanium peroxide dispersion prepared as described above was weighed out, and was further heated for 5 hours at 100° C., whereby 97 g of a pale yellow 1.81 wt % anatase-type titanium peroxide dispersion was obtained. A dispersion in which the above-mentioned amorphous type and anatase type were mixed in a ratio of 7:3 was then prepared.

Refined sucrose was further added to the dispersion in any of various amounts (wt %) as shown in Table 1 and stirring was carried out, thus preparing super-hydrophilic photocatalytic coating film forming liquids of those concentrations (wt %).

Comparative Example 1

The amorphous-type titanium peroxide dispersion prepared during the manufacture of the super-hydrophilic photocatalytic coating film forming liquid of Example 1, i.e. the dispersion in Example 1 before adding the refined sucrose, was taken as the coating film forming liquid of Comparative Example 1.

Comparative Example 2

200 g of the amorphous-type titanium peroxide dispersion prepared during the manufacture of the super-hydrophilic photocatalytic coating film forming liquid of Example 1 was weighed out, and was heated for 5 hours at 100° C., whereby a yellow transparent anatase-type titanium peroxide dispersion of solid content 1.75 wt % was obtained. This dispersion was taken as the coating film forming liquid of Comparative Example 2.

[Outline of Coating Film Performance Evaluation Tests]

A film was formed on apiece of glass using each of the coating film forming liquids of the above Examples and Comparative Examples, and then heating was carried out, thus preparing performance evaluation glass test pieces each having a coating film thereon. Using each of the glass test pieces, the transparency, the wear resistance, the hydrophilicity, the water-retaining ability and the photocatalytic ability were evaluated.

[Method of Preparing Glass Test Pieces]

A film of the coating film forming liquid of each of the above Examples and Comparative Examples was formed on a piece of transparent float glass (100×100×4 mm) by spraying such that the film thickness after heating would be 0.3 μm, drying was carried out, and then heating was carried out for 15 minutes at 550° C. in an electric furnace, and then cooling was carried out, thus obtaining a performance evaluation glass test piece.

[Evaluation of Transparency]

The transparency was evaluated as follows. Each performance evaluation glass test piece was visually compared with a piece of transparent float glass that had not had a coating film formed thereon, and the transparency was evaluated as excellent, satisfactory or poor. The evaluation results are shown in Table 1 as "good", "fair" or "poor".

[Evaluation of Wear Resistance]

The wear resistance was evaluated as follows. A commercially sold pulp tissue was folded up, each glass test piece was rubbed 100 times, and the result there of was evaluated by visual observation. No scratchingwas taken as "excellent", slight scratching as "good", and much scratching as "poor".

[Evaluation of Hydrophilicity]

The hydrophilicity was evaluated by storing each glass test piece in a dark place for 7 days, and then measuring the contact angle using a contact angle evaluating device (CA-X150 made by Kyowa Interface Science Co., Ltd.) without illumination. This measurement was carried out at 3 places, and the mean was calculated, rounding up or down to the nearest whole number; the result is shown as the contact angle in Table 1.

[Evaluation of Water-Retaining Ability]

For the evaluation of the water-retaining ability, a film of pure water was sprayed as a mist onto each glass test piece, and then the glass test piece was left standing upright at room temperature (20° C.), and then the glass test piece was observed visually; in the case that the water was retained for at least 10 minutes the evaluation was taken as "good", whereas in the case that the water was retained for less than this the evaluation was taken as "poor".

[Evaluation of Photocatalytic Ability]

For the evaluation of the photocatalytic ability, the oxidative decomposition ability was evaluated by coloring each sample using an organic dye and measuring the decolorization ability; specifically, the evaluation was carried out as follows.

A liquid obtained by diluting a commercially sold red ink (made by Pilot) by a factor of 20 with pure water was first applied uniformly at 0.6 g/m$^2$ onto each of the glass test pieces, the resulting tile was exposed to sunlight outside for 20 minutes, and then the change in the color of tile surface between before and after the exposure was measured using a colorimeter (Minolta CR-200).

The decolorization ability of each sample can be measured from these measurement results, whereby the ability to oxidatively decompose an organic compound can be evaluated for each sample, and hence the photocatalytic ability can be evaluated. The measurement values from the colorimeter are represented as L*, a* and b*, and in the present evaluation tests these were measured before and after the exposure. The evaluation results are shown in Table 1, and the measurement results are shown in Table 2.

[Color Change Measurement Values]

The measurement values L*, a* and b* from the colorimeter represent the following.

L*: Represents the lightness. A large value indicates high lightness.

a*: Represents variation in color between red and green. A positive value indicates a red color, with a large value indicating that the red color is deep. A negative value indicates a green color, with a large value indicating that the green color is deep. Moreover, a value of 0 indicates achromaticity.

b*: Represents variation in color between yellow and blue. A positive value indicates a yellow color, with a large value indicating that the yellow color is deep. A negative value indicates a blue color, with a large value indicating that the blue color is deep. Moreover, a value of 0 indicates achromaticity.

[Color Change Evaluation Method]

The color change is evaluated through ΔE*, the value of which is calculated from L*, a* and b*, and is as follows.

ΔE*: Represents the color difference (the amount of change in color with the passage of time)

If the amount of change in color with the passage of time is large, then the value of ΔE* is large. ΔE* is calculated from the following formula.

$$\Delta E^*ab = [(\Delta L^*)^2 + (\Delta a^*)^2 + (\Delta b^*)^2]^{1/2}$$

The ΔE* calculated in the present evaluation tests is as follows.

$$\Delta E^*ab = [(L^*_1 - L^*_2)^2 + (a^*_1 - a^*_2)^2 + (b^*_1 - b^*_2)^2]^{1/2}$$

(where $L^*_1$: lightness before illumination
$a^*_1$, $b^*_1$: color before illumination
$L^*_2$: lightness after illumination
$a^*_2$, $b^*_2$: color after illumination)

[Evaluation Results]

[Results of Transparency Evaluation Tests]

The results of these evaluation tests are as shown in Table 1. From Table 1, it can be seen that in the case of using a coating film forming liquid containing undoped amorphous-type titanium peroxide (Example 1), and in the case of using a coating film forming liquid containing amorphous-type titanium peroxide doped with silica or amorphous-type titanium peroxide doped with calcium (Example 2, Example 3), and in the case of using a coating film forming liquid having mixed therein in a ratio of 7:3 amorphous-type titanium peroxide and anatase-type titanium peroxide each doped with zirconium (Example 4), a coating film having excellent transparency could be formed.

[Results of Evaluation of Wear Resistance]

The results of these evaluation tests are also as shown in Table 1. From Table 1, it can be seen that in the case of using a coating film forming liquid containing titanium peroxide doped with silica or calcium or zirconium (Example 2, Example 3, Example 4), the wear resistance was excellent. Moreover, it can be seen that the wear resistance is better if the amorphous-type titanium peroxide content is higher, and moreover that it is preferable for the amount added of the saccharide to be low.

[Results of Evaluation of Hydrophilicity and Water-Retaining Ability]

The results of these evaluation tests are also as shown in Table 1. From Table 1, it can be seen that in the case of using the coating film forming liquid of any of the Examples, i.e. a coating film forming liquid containing undoped amorphous-type titanium peroxide, amorphous-type titanium peroxide doped with silica or amorphous-type titanium peroxide doped with calcium, or a coating film forming liquid having mixed therein in a ratio of 7:3 amorphous-type titanium peroxide and anatase-type titanium peroxide each doped with zirconium, the contact angle was less than 10°, and the water-retaining ability was at least 10 minutes, and hence the hydrophilicity and water-retaining ability were better than in the case of using the coating film forming liquid of Comparative Example 1 or Comparative Example 2.

[Results of Evaluating Photocatalytic Ability]

The results of these evaluation tests are as shown in Tables 1 and 2. From these results, it can be seen that in the case that the content of amorphous-type titanium peroxide in the coating film forming liquid is high, and moreover the content of the saccharide is 0.5% or less, or in the case of a coating film forming liquid not containing the saccharide, i.e. a coating film forming liquid of either of the Comparative Examples, the photocatalytic ability was not high, whereas in the other cases, the photocatalytic ability was excellent.

TABLE 1

| Aqueous liquid used | Example 1 | | | Example 2 | | Example 3 | | Example 4 | | Comparative Example 1 | Comparative Example 2 |
|---|---|---|---|---|---|---|---|---|---|---|---|
| Amount added of saccharide | 2% | 0.5% | 10% | 2% | 0.5% | 2% | 0.5% | 2% | 0.5% | — | — |
| Dopant | None | | | Silica | | Calcium | | Zirconium | | | |
| Film thickness (?m) | 0.3 | 0.3 | 0.3 | 0.3 | 0.3 | 0.3 | 0.3 | 0.3 | 0.3 | 0.3 | 0.3 |
| Transparency | Good | Good | Good | Good | Good | Good | Good | Good | Good | Good | Fair |
| Wear resistance | Poor | Fair | Fair | Excellent | Excellent | Good | Excellent | Excellent | Excellent | Good | Poor |
| Superhydrophilicity | 4° | 8° | 2° | 3° | 5° | 7° | 8° | 5° | 7° | 30° | 10° |
| Water-retaining ability | Good | Good | Good | Good | Good | Good | Good | Good | Good | Poor | Poor |
| Photocatalytic ability | Excellent | Excellent | Excellent | Excellent | Excellent | Good | Fair | Excellent | Good | Poor | Fair |

TABLE 2

| Aqueous liquid used | Example 1 | | | Example 2 | | Example 3 | | Example 4 | | Comparative Example 1 | Comparative Example 2 |
|---|---|---|---|---|---|---|---|---|---|---|---|
| Amount added of saccharide | 2% | 0.5% | 10% | 2% | 0.5% | 2% | 0.5% | 2% | 0.5% | — | — |
| Dopant | None | | | Silica | | Calcium | | Zirconium | | | |
| Film thickness (?m) | 0.3 | 0.3 | 0.3 | 0.3 | 0.3 | 0.3 | 0.3 | 0.3 | 0.3 | 0.3 | 0.3 |
| 0 min L* | 77.45 | 76.13 | 76.87 | 76.42 | 78.65 | 79.12 | 78.94 | 76.92 | 76.35 | 76.85 | 81.37 |

TABLE 2-continued

| Aqueous liquid used | | Example 1 | | Example 2 | | Example 3 | | Example 4 | | Comparative Example 1 | Comparative Example 2 |
|---|---|---|---|---|---|---|---|---|---|---|---|
| sunlight | a* | 36.87 | 39.02 | 38.61 | 37.93 | 33.30 | 31.77 | 29.32 | 36.52 | 35.98 | 35.05 | 27.85 |
| | b* | 1.02 | 1.98 | 4.03 | 6.34 | 2.87 | 1.24 | −0.04 | 6.62 | 5.82 | 1.98 | −2.16 |
| 10 min | L* | 87.37 | 85.96 | 88.83 | 81.27 | 85.70 | 81.36 | 79.89 | 81.12 | 80.02 | 77.05 | 87.41 |
| sunlight | a* | 13.95 | 16.70 | 11.24 | 27.48 | 16.60 | 26.88 | 28.08 | 24.70 | 27.87 | 35.02 | 10.73 |
| | b* | 0.42 | −0.39 | 2.19 | −1.47 | −0.16 | −2.71 | −4.73 | 4.19 | 3.63 | 1.99 | 0.27 |
| | ΔE* | 24.98 | 24.50 | 29.93 | 13.92 | 18.38 | 6.67 | 4.94 | 12.78 | 9.17 | 0.20 | 17.03 |
| 20 min | L* | 93.11 | 93.09 | 93.58 | 92.75 | 92.88 | 87.68 | 82.08 | 92.51 | 90.49 | 77.06 | 89.99 |
| sunlight | a* | 0.65 | 0.76 | 0.38 | 0.67 | 0.46 | 11.50 | 23.11 | 1.29 | 6.40 | 34.98 | 6.87 |
| | b* | 4.28 | 3.65 | 4.31 | 5.90 | 4.57 | 1.34 | −3.52 | 1.19 | 1.89 | 2.01 | 2.57 |
| | ΔE* | 39.59 | 41.88 | 41.72 | 40.68 | 35.83 | 22.00 | 7.78 | 38.91 | 33.02 | 0.21 | 23.14 |

The results of the performance evaluation tests described above show that a coating film on a structure of the present invention formed using a coating film forming liquid containing amorphous-type titanium peroxide, silica-doped amorphous-type titanium peroxide, calcium-doped amorphous-type titanium peroxide, or zirconia-doped mixed amorphous-type and anatase-type titanium peroxide, and a saccharide, in particular a coating film forming liquid having a saccharide mixed therein in an amount in a range of 0.1 to 10%, has a water-retaining ability of at least 10 minutes and a super-hydrophilicity of no more than 10° without photoexcitation, and also has excellent photocatalytic ability.

Moreover, upon using glucose or sorbitol instead of the sucrose described above, and carrying out performance evaluation tests as in the case of using sucrose, it was found that properties similar to in the case of using sucrose were realized.

INDUSTRIAL APPLICABILITY

According to the present invention, a photocatalytic coating film that is super-hydrophilic, having a contact angle of less than 10°, in a state in which the photocatalyst is not excited, and has good water-retaining ability can be formed attached to a substrate. This coating film can be formed on glass, a metal plate, a plate-shaped ceramic such as a tile, or the like. As a results, even in an environment in which a high-humidity state is produced, an anti-fogging photocatalytic coating film can be used. For example, the anti-fogging photocatalytic coating film can be used on a mirror, a tile, or the surface of window glass inside an automobile. Furthermore, by using a coating film in which fine particles of a titanium oxide having peroxy groups have been doped with a calcium compound or silica or zirconium, the coating film can be given not only super-hydrophilicity but also good wear resistance.

The invention claimed is:

1. A super-hydrophilic photocatalytic coating film forming liquid comprising a saccharide and titanium oxide fine particles, wherein the titanium oxide fine particles have a particle size of approximately 2 to 10 nm; and wherein the film formed by the forming liquid exhibits a water contact angle of less than 10° in a state in which the photocatalyst is not excited.

2. A super-hydrophilic photocatalytic coating film forming liquid according to claim 1, wherein said saccharide is a monosaccharide or a disaccharide.

3. A super-hydrophilic photocatalytic coating film forming liquid according to claim 1, wherein said titanium oxide fine particles are amorphous or anatase.

4. A super-hydrophilic photocatalytic coating film forming liquid according to claim 1, wherein said titanium oxide fine particles coexist with a calcium compound or silica or zirconium.

5. A super-hydrophilic photocatalytic coating film forming liquid according to claim 1, wherein said titanium oxide fine particles have peroxy groups.

6. A structure having a super-hydrophilic photocatalytic coating film, the structure having the super-hydrophilic photocatalytic coating film on a surface thereof, wherein the film exhibits a water contact angle of less than 10° in a state in which the photocatalyst is not excited; wherein the super-hydrophilic photocatalytic coating film contains titanium oxide fine particles, and wherein the titanium oxide fine particles have a particle size of approximately 2 to 10 nm.

7. The structure having a super-hydrophilic photocatalytic coating film according to claim 6, wherein said titanium oxide fine particles coexist with a calcium compound or silica or zirconium.

8. The structure having a supar-hydrophilic photocatalytic coating film according to claim 6, wherein said structure is glass, metal or a ceramic.

9. A method of manufacturing a structure having a super-hydrophilic photocatalytic coating film, comprising:

applying a coating film forming liquid containing a saccharide and titanium oxide fine particles onto a surface of a prescribed structure; and heating, thus forming a coating film containing the titanium oxide fine particles, wherein the titanium oxide fine particles have a particle size of approximately 2 to 10 nm; and wherein the coating film exhibits a water contact angle of less than 10° in a state in which the photocatalyst is not excited.

10. The method of manufacturing a structure having a super-hydrophilic photocatalytic coating film according to claim 9, wherein said titanium oxide fine particles have peroxy groups.

11. The method of manufacturing a structure having a super-hydrophilic photocatalytic coating film according to claim 9, wherein the temperature of said heating is 400 to 800° C.

12. A method of manufacturing a structure having a super-hydrophilic photocatalytic coating film, comprising:

applying a coating film forming liquid containing a saccharide and titanium oxide fine particles coexisting with a calcium compound or silica or zirconium onto a surface of a prescribed structure; and heating, thus forming a coating film containing the titanium oxide fine particles,
wherein the titanium oxide fine particles have a particle size of approximately 2 to 10 nm; and wherein the coating film exhibits a water contact angle of less than 10° in a state in which the photocatalyst is not excited.

13. The method of manufacturing a structure having a super-hydrophilic photocatalytic coating film according to claim 12, wherein said titanium oxide fine particles have peroxy groups.

14. The method of manufacturing a structure having a super-hydrophilic photocatalytic coating film according to claim 12, wherein the temperature of said heating is 400 to 800° C.

* * * * *